Patented Nov. 20, 1928.

1,692,237

UNITED STATES PATENT OFFICE.

EDWIN C. WHITE, OF BALTIMORE, MARYLAND.

ORGANIC COMPOUND OF MERCURY AND PROCESS OF PRODUCING SAME.

No Drawing.  Application filed January 27, 1927. Serial No. 164,135.

This invention relates to novel combinations of mercuric salts with substituted or unsubstituted sulfon-fluoresceins. The combinations possess disinfectant, germicidal and antiseptic properties, and may be applied locally or injected into the body.

The parent sulfon-fluoresceins may be represented by the formula,—

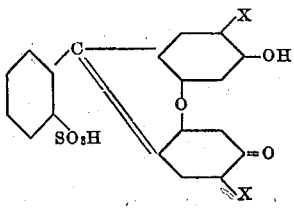

in which X represents either the original hydrogen atom or a substituent group or atom, especially a halogen atom. The mercuration products are believed to be represented by the furmulas,—

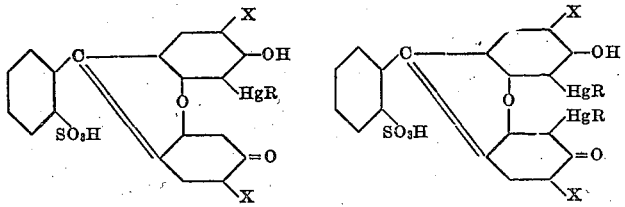

or the alkali metal salts thereof, where X has the meaning just indicated and R is a group attached to the mercury, such as $CH_3COO$, OH, or a halogen. The nature of this group R will depend upon the particular mercury salt used to prepare the combinations. The words "mercury salt" as used here are also intended to include oxides of mercury. The structural formulas given above are believed to be the probable ones, but their correctness is not vouched for.

The following example illustrates the mode of preparation.

5.26 grams (1/100 gram molecule) of dibrom sulfon-fluorescein is dissolved by adding a sufficient amount of a solution of a caustic alkali, and diluted suitably. A filtered solution of 3.2 grams (1/100 gram molecule) of mercuric acetate in water is gradually added with stirring. The solution is heated to boiling with stirring for 15–30 minutes. On standing some hours, a precipitate settles. Normal alkali solution is then added drop by drop, with stirring, until the precipitate is nearly all dissolved. The solution is filtered and evaporated to dryness. This may be accomplished either by allowing it to evaporate spontaneously in thin layers, or at elevated temperatures, with or without the use of vacuum. The product forms dark greenish scales.

In place of dibrom sulfon-fluorescein, the molecular equivalent amount (1/100 gram molecule) of any other sulfon-fluorescein may be used. The parent substance, sulfon-fluorescein itself, may be used, or any other halogenated or otherwise substituted sulfon-fluorescein, may be used. Also, in place of mercuric acetate, any other salt of mercury, in molecular equivalent amount may be used.

Instead of 1/100 gram molecule of the mercury salt, twice this amount may be used, giving a ratio of 2 atoms of mercury to 1 molecule of dye instead of the ratio of 1:1 used in the above example.

I claim:

1. Mercury derivatives of sulfon-fluorescein.

2. Mercury derivatives of substituted sulfon-fluoresceins.

3. Mercury derivatives of halogenated sulfon-fluoresceins.

4. Mercury derivatives of dihalogenated sulfon-fluoresceins.

5. Mercury derivatives of dibrom sulfon-fluorescein.

6. Alkali metal salts of mercury derivatives of sulfon-fluoresceins.

7. Alkali metal salts of mercury derivatives of halogenated sulfon-fluoresceins.

8. Alkali metal salts of mercury derivatives of dihalogenated sulfon-fluoresceins.

9. Alkali metal salts of mercury derivatives of dibrom-sulfon-fluorescein.

10. Process of preparing mercury derivatives of sulfon-fluoresceins by the action of a salt of mercury on a salt of sulfon-fluorescein.

11. Process of preparing mercury derivatives of substituted sulfon-fluoresceins by the action of a salt of mercury on a salt of substituted sulfon-fluorescein.

12. Process of preparing mercury derivatives of halogenated sulfon-fluoresceins by the action of a salt of mercury on a salt of a halogenated sulfon-fluorescein.

13. Process of preparing mercury derivatives of dihalogenated sulfon-fluoresceins by the action of a salt of mercury on a salt of a halogenated sulfon-fluorescein.

14. Process of preparing mercury derivatives of dibrom-sulfon-fluorescein by the action of a salt of mercury on a salt of dibrom-sulfon-fluorescein.

EDWIN C. WHITE.